UNITED STATES PATENT OFFICE 2,591,776

DIPHENYL ETHERS AND PROCESS OF PREPARING SAME

Edward Teggin Borrows, London, England, assignor to Glaxo Laboratories Limited, Greenford, England, a British company No Drawing. Application April 24, 1950, Serial No. 157,855. In Great Britain October 23, 1947

17 Claims. (Cl. 260—309.5)

This invention which is a continuation-in-part of the invention described in my application Serial No. 54,585 filed October 14, 1948, is concerned with improvements in or relating to the preparation of diphenyl ethers of the general formula

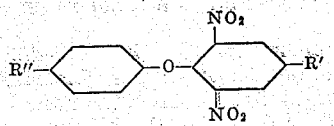

where R' and R'' have the meanings stated below.

It has been found that these diphenyl ethers can be readily prepared by reacting a dinitrophenyl quaternary salt of general formula

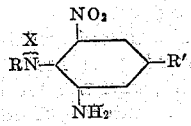

(where RN is a tertiary base which may be aliphatic, partly aromatic, or one in which the nitrogen is part of a heterocyclic ring, R' is any substituent such as will not interfere with the reaction and preferably a group readily convertible to an alanine side chain and X is a suitable anion as hereinafter defined), with a phenol of the general formula

where R'' is a group such as will not interfere with the reaction.

It should be noted that the new products obtained when R' is a group readily convertible into an alanine side chain and R'' a hydroxy group or a group readily convertible thereto are valuable in the synthesis of thyroxine.

The term "a suitable anion" as used herein means the anionic portion of an aryl sulphonic acid, or of hydrochloric acid, hydrobromic acid or hydriodic acid.

According to the invention therefore there is provided a process for the preparation of diphenyl ethers of the type specified in which a quaternary salt of general formula

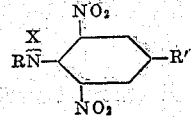

is reacted with a phenol of general formula

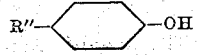

where RN, R', R'' and X have the meanings stated herein.

It has been found that in order that the diphenyl ethers of the above general formula may be useful in the synthesis of thyroxine, it is preferable that the group R' should be one of the following groups:

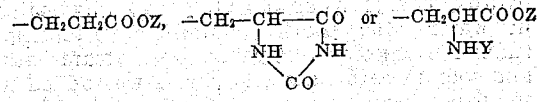

where Z is an alkyl group containing not more than four carbon atoms and Y is an acyl group, such as an acetyl group or a benzoyl group. These groups are all convertible by the usual methods into an alanine side chain.

For similar reasons it has been found further, that it is preferable that R'' should be a hydroxyl group, a hydroxyl group protected by a group removable therefrom such as a methyl, ethyl or acetyl group or an amino group protected by an acyl group such as an acetyl, propinoyl or benzoyl group.

While the process according to the invention is readily carried out in the absence of a solvent, it has been found that generally the presence of a suitable solvent is preferable. The choice of solvent is somewhat difficult but a solvent having a dielectric constant less than 25 is found to be satisfactory. Examples of such solvents are liquid sulphur dioxide, liquid ammonia and benzene, or an excess of the tertiary base RN, such for example as an excess of pyridine.

At present it has been found that it is preferable that the suitable anion should be the anion of p-toluene sulphonic acid.

Examples of the suitable tertiary base RN are pyridine, diethylaniline, the picolines, dimethylpyridines and trimethyl-pyridines.

According to a still further feature of the invention it has been found that in many cases where the suitable anion is the anion of an aryl sulphonic acid it is not necessary to preprepare and/or isolate the quaternary salt or even the ester from which it is normally prepared as the reaction of the present invention can be conveniently carried out provided that the several components for forming these substances are present in the proper proportions. This method of procedure is illustrated in Example 4.

At present it has been found to be preferable to prepare compounds in which R" is a hydroxyl, methoxy or acetoxy group and the invention accordingly specifically includes the preparation of such compounds.

It has been found further that where the group R' is

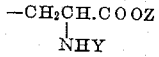

which contains an optically active carbon atom, the use of the optically active dinitrophenol in the process according to the invention yields an optically active dinitrodiphenyl ether. Thus for example if a laevo compound is used, a laevo product is obtained. The production of optically active isomers in this way is of use in the synthesis of L-thyroxine which compound has greater physiological activity than racemic thyroxine. The invention therefore includes the use of optically active starting materials where the group R' is

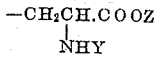

In order that the invention may be well understood the following examples are given only as illustrations:

EXAMPLE 1

*Preparation of 3:5-dinitro-4-(4'-hydroxy- or methoxy-phenoxy) benzylhydantoin*

(a) *Preparation of tosyl ester.*—3:5-dinitro-4-hydroxy benzyl hydantoin (10 parts) was heated in water (100 parts) containing p-toluenesulphonyl chloride (6.4 parts) on a steam bath, and sodium carbonate (1.8 parts) was added in small portions. When half the latter had been added a white solid began to separate out. Heating was continued for two hours, the reaction mixture was cooled and the solid product filtered off and dried. The product on recrystallisation from aqueous alcohol yielded the tosyl ester. (70%) M. P. 208°.

(b) *Condensation with hydroquinone.*—The above tosyl ester (1 part) and hydroquinone (1 part) in pyridine (10 parts) was heated under reflux for 1 hour. The solution was evaporated in vacuo to dryness and the residue extracted with hot acetic acid. The filtered acetic acid solution after treatment with charcoal, was diluted with water when 3:5-dinitro-4-(4'-hydroxyphenoxy)-benzyl hydantoin separated as yellow prisms. (49%) M. P. 242°. Found C, 49.7, H, 3.4; N, 14.1%; $C_{16}H_{12}O_8N_4$ requires C, 49.5; H, 3.1; N, 14.4%.

(c) Condensation with quinol monomethyl ether.—The above toluene sulphonyl ester (20 parts) was heated in pyridine (100 parts) with quinolmonomethyl ether (20 parts) at 140° for 30 minutes. The reaction mixture when worked up as above yielded 3:5-dinitro-4-(4'-methoxyphenoxy)-benzyl hydantoin in yellow prisms. (76%) M. P. 235°. (Found C, 50.75; H, 3.8; N, 13.9%; $C_{17}H_{14}O_8N_4$ requires C, 50.7; H, 3.5; N, 13.9%.)

EXAMPLE 2

*Preparation of ethyl 3:5-dinitro-4(4'-methoxy-phenoxy) dihydrocinnamate*

(a) *Preparation of tosyl derivative.*—Ethyl-3:5-dinitro-4-hydroxy-dihydrocinnamate (7.1 parts) and diethylaniline (20 parts) were treated with toluenesulphonyl chloride (6 parts) on the steam bath for four hours during which time a red homogeneous solution was formed. The mixture was washed with dilute hydrochloric acid and ethyl alcohol and the product crystallised from aqueous acetic acid to yield the tosyl derivative. (63%) M. P. 102°.

(b) *Condensation with quinolmonomethyl ether.*—The tosyl derivative (22 parts) and quinolmonomethyl ether (20 parts) were refluxed in pyridine solution for one hour. The hot solution was diluted with water and a little alcohol and the deposited solid filtered and recrystallised from methyl alcohol. (95%) M. P. 102°.

(c) *Preparation of the pyridinium quaternary salt from the tosyl ester.*—The tosyl ester (44 parts) in pyridine (200 parts) was heated for ten minutes and the product precipitated with ether; the quaternary compound was crystallised from a mixture of ethyl alcohol/ether. (89%) M. P. 172°.

(d) *Condensation of the quaternary salt with quinolmonomethyl ether.*—The quaternary salt (25 parts) was dissolved in liquid ammonia (2000 parts) to which quinol monomethyl ether (20 parts) was added rapidly. The solvent was allowed to evaporate off during about three hours and the residue crystallised from ethyl alcohol giving ethyl 3:5-dinitro-4-(4'-methoxy-phenoxy) dihydrocinnamate. (97%) M. P. 100°. Recrystallisation from ethyl alcohol raised the M. P. to 102°.

(e) *Preparation of ethyl 3:5-dinitro-4-pyridinium-dihydrocinnamate chloride.*—Ethyl-4-chloro-3:5-dinitrodihydrocinnamate was dissolved in pyridine and the solution refluxed for ten minutes. The cooled solution yielded the quaternary salt on dilution with ether: the product was recrystallised from alcohol, M. P. 166–167°.

(f) The quaternary salt treated with quinolmonomethyl ether as in (d) above yielded the diphenyl ether (96%).

(g) Ethyl-4-chloro-3:5-dinitro dihydrocinnamate was dissolved in pyridine to form the quaternary salt as above, and the solution refluxed for one hour after the addition of quinolmonomethyl ether. The product was isolated as in Example 2 (b).

EXAMPLE 3

*Preparation of 3:5-dinitro-4-(4'-methoxyphen-oxy)-toluene*

(a) 3:5-dinitro-4-tosyloxy-toluene (35 parts) was treated in liquid $SO_2$ for three hours with pyridine (24 parts) and quinolmonomethyl ether (40 parts). After removal of $SO_2$ by evaporation the residue was crystallised from alcohol to give 3:5 - dinitro-4-(4'-methoxyphenoxy) - toluene. (12%) M. P. 146°.

(b) 4-bromo-3:5-dinitrotoluene (5 parts) was dissolved in pyridine (50 parts) to form the quaternary compound and the solution was refluxed with quinolmonomethyl ether (5 parts) for one hour. The residue obtained on evaporation of the pyridine was treated with dilute alkali to yield the above diphenyl ether, M. P. 142°.

(c) *Preparation of 3:5-dinitro-4-benzenesulphonyloxy-toluene.*—3:5 - dinitro - p - cresol (5 parts) was heated with water (10 parts) and sodium carbonate (.53 parts) till dissolved when benzene sulphonyl chloride (1.6 parts) was added slowly with stirring. After one hour the precipitated benzene sulphonyl ester was filtered, washed with sodium carbonate solution and water, and recrystallised from acetic acid as yellow plates (60%) M. P. 166°.

(d) The benzene sulphonyl ester (1 part), quinolmonomethyl ether (1 part) and pyridine (15 parts) were refluxed for one hour. The cooled solution was poured into dilute sodium hydroxide and the product which separated was recrystallised from alcohol to form pale yellow needles (94%) M. P. 146°.

(e) The preparation was carried out exactly as in (d) using collidine, to give the diphenyl ether M. P. 146°.

(f) 3:5-dinitro-4-tosyloxy toluene (1 part), quinolmonomethyl ether (1 part) and diethylaniline (10 parts) were heated in an oil bath at 140° for six hours. The cooled solution was diluted with chloroform and washed with dilute hydrochloric acid, water and sodium carbonate solution. The chloroform solution was evaporated to dryness and the residue crystallised from alcohol to obtain the diphenyl ether.

(g) 3:5-dinitro-4-toluene-sulphonyloxy-toluene (2 parts), quinolmonomethyl ether (2 parts) and triethylamine (20 parts) were refluxed for one hour, and the excessive base distilled off. The residue was washed with dilute hydrochloric acid and dilute alkali and the filtered solid crystallised from methyl alcohol gave 3:5-dinitro-4-(4'-methoxyphenoxy) toluene.

(h) *Preparation of 3:5 dinitro-4-pyridinium toluene toluenesulphonate.*—3:5-dinitro-4-tosyloxy toluene (1 part) with dry pyridine (5 parts) was heated on the steam bath for five minutes. The mixture was cooled and diluted with ether. The solid which separated was filtered and crystallised from alcohol to yield the quaternary compound as long colourless needles (70%) M. P. 184°.

(j) The quaternary salt (5 parts) was refluxed with quinolmonomethyl ether (5 parts) in benzene (50 parts) for two hours. The solvent was removed in vacuo and the diphenyl ether isolated as usual (50%).

(k) The reaction carried out as in (j) using ethyl acetate or amyl acetate as solvent, gave the diphenyl ether in 30% and 20% yields.

EXAMPLE 4

*Preparation of 3:5-dinitro-4-phenoxy toluene*

(a) The quaternary salt prepared in Example 3 (h), (1 part) was heated in an oil bath with phenol (4 parts) at 180° for three hours. The cooled reaction mixture was poured into 2 N alkali and the crystalline solid filtered and crystallised from ethyl alcohol to give the diphenyl ether as yellow needles (86%) M. P. 134°.

(b) 3:5-dinitro-p-cresol (5 parts), toluenesulphonylchloride (5 parts) and pyridine (20 parts) were heated in an oil bath at 100-110° for one hour. Phenol (20 parts) was added and the mixture heated at 180-190° for three hours. The melt was poured into 2 N caustic soda and the precipitated solid was filtered and crystallised from ethyl alcohol giving the above diphenyl ether. (60%) M. P. 134°.

EXAMPLE 5

*Preparation of 3:5-dinitro 4(4'-methylphenoxy) toluene*

The quaternary salt prepared in Example 3 (h) (2.5 parts) was refluxed for 30 minutes in pyridine with p-cresol (2 parts). The cooled solution was poured into 200 mls. of 2 N sodium hydroxide, the precipitated solid was filtered and crystallised from alcohol as pale yellow prisms. (78%) M. P. 109°.

EXAMPLE 6

*Preparation of 3:5-dinitro-4(4'-nitrophenoxy)-toluene*

The quaternary salt used in the preceding example (2.5 parts) p-nitro phenol (2 parts) and pyridine (10 parts) were refluxed for 30 minutes. The diphenyl ether was isolated as above and crystallised from benzene/petroleum ether mixture (60%) M. P. 172°.

EXAMPLE 7

*Preparation of 3:5-dinitro-4(4'-carbomethoxyphenoxy) toluene*

The quaternary salt used above (2 parts), methyl 4-hydroxybenzoate (2 parts) and pyridine (10 parts) were refluxed for 30 minutes and the diphenyl ether isolated as above and crystallised from ethyl alcohol to give bright yellow needles (78%) M. P. 137-138°.

EXAMPLE 8

*Preparation of 3:5-dinitro - 4(4' - methoxyphenoxy) benzoate*

Methyl 4-chloro-3:5-dinitrobenzoate (1 part) dissolved in pyridine to form a deep red solution from which the pyridinium quaternary compound separated on standing. Quinolmonomethyl ether was added to the mixture and the whole refluxed for 30 minutes. The cooled solution was poured into 2 N caustic soda and the precipitated methyl-3:5-dinitro 4(4'-methoxy-phenoxy) benzoate was filtered off and crystallised (50%) M. P. 128°.

EXAMPLE 9

*L-3:5-dinitro-4(4'-methoxyphenoxy)N-acetylphenylalanine ethyl ester*

L-N-Acetyldinitrotyrosine ethyl ester (20 g. 1 mol) and p-toluenesulphonyl chloride (12.4 g. 1.1 mols) were dissolved in dry pyridine (100 ml.) and warmed in the steam bath until all the material was in solution. Quinol monomethyl ether (21.3 g. 3 moles) was added and the solution refluxed for one hour. The pyridine was then removed in vacuo and the residual oil was taken up in ethyl acetate (200 ml.) and shaken with 2 N HCl (2×50 ml.) in order to free it from traces of pyridine. The ethyl acetate was removed by distillation and the residual oil taken into alcohol from which it was precipitated with water. The precipitated oil was taken into boiling ethyl acetate (charcoal) and precipitated out with petrol B. P. 60-80°. Yield 18.3 g. (70%) M. P. 110-111°. (Found C, 53.2; H, 4.72; N, 9.4; $C_{20}H_{21}O_9N_3$ requires C, 53.7; H, 4.70; N, 9.4% $(a)_D$ —22.2°.)

EXAMPLE 10

*L-3:5-dinitro-4(4'-acetoxyphenoxy) N-acetyl phenylalanine ethyl ester*

L-3:5-dinitro-N-acetyltyrosine ethyl ester (1.3 g. 1 mol) and p-toluene-sulphonyl chloride (0.75 g. 1.05 moles) were dissolved in dry pyridine (20 mls.) by heating to 60-70° on the steam bath. p-Acetoxyphenol (1.52 g. 2.5 moles) was added and the solution refluxed for 1 hour. The pyridine was removed in vacuo and the residual oil treated with boiling ethyl acetate; the majority of the material was soluble but a black residual oil was left. The ethyl acetate was decanted off and taken to dryness when a clear amber gum was obtained. This was dissolved in alcohol, precipitated by addition of water, and then charcoaled in ethyl acetate solution from which it was precipitated with petroleum ether B. P. 60–80°. The gum was then dissolved in acetone and passed through an alumina column; a clear yellow acetone solution was obtained and on removing the acetone by distillation a clear gum was obtained which solidified on scratching, yield 1.05 g. (55%) M. P. 104–106°. This material was recrystallised twice from benzene—M. P. 105–106°. (Found C, 52.7; H, 4.4; N, 8.8%; $C_{21}H_{21}O_{10}N_3$ requires C, 52.8; H, 4.4; N, 8.8% $(a)_D$ —20.5°.)

EXAMPLE 11

(a) *Monopropionylquinol.*—Propionic anhydride (5.9 ml.) was added dropwise to a stirred cooled solution of hydroquinone (5 g.) and sodium carbonate (1.43 g.) in water (100 ml.) to which a small amount of sodium hydrosulphite had been added. During the reaction sodium carbonate solution was added to keep the solution alkaline and after two hours the precipitate was filtered off and recrystallised from petrol ether as colourless needles M. P. 110° (3.25 g.) Analysis identified it as

| dipropionylquinol | Found: C, 64.4 H, 6.1% |
|---|---|
| $C_{12}H_{14}O_4$ requires: | C, 64.9 H, 6.3% |

The mother liquors were acidified and extracted with ether and the extract dried and evaporated and the residue thoroughly extracted with boiling petrol ether (B. P. 60–80°) and on cooling the monopropionate crystallised as fine colourless needles M. P. 78° (0.7 g.) (found: C. 65.5, H, 5.85% $C_9H_{10}O_3$ requires C, 65.1; H. 6.0%).

(b) *3:5 - dinitro - 4(4'-propionyloxyphenoxy) toluene.*—A solution of 3:5-dinitro-4-tosyloxytoluene (1 g.) and monopropionylquinol (1 g.) in dry pyridine (10 g.) was refluxed for 45 minutes and then cooled and poured into water. The brown solid was recrystallised from ethyl alcohol as yellow prisms M. P. 150° (0.3 g.) (found C, 55.7; H, 3.9; N, 8.2% $C_{16}H_{14}O_7N_2$ requires C, 55.5; H, 4.05; N, 8.1%).

EXAMPLE 12

*3:5-dinitro-4-4'-acetamidophenoxytoluene*

3:5-dinitro-p-cresol (2.5 g.) and p-toluene sulphonyl chloride (2.5 g. 1 mol) in pyridine (10 c. c.) were heated at 110° for ½ hour. The solution was then cooled, and p-acetamidophenol (10 g.) was added. After having been heated at 120° for 2 hours the mixture was poured into dilute caustic soda solution. The brown oil crystallised on scratching (3.7 g.; 89%). The pure ether separated from alcohol as yellow needles M. P. 195° (found N, 12.6. $C_{15}H_{13}O_6N_3$ requires N, 12.7%).

EXAMPLE 13

*3:5-dinitro-4-(4'-acetamidophenoxy-N-acetyl)-DL-phenylalanine ethyl ester*

3:5-dinitro-N-acetyl-DL-tyrosine ethyl ester (16 g.) and p-toluene sulphonyl chloride (9.8 g. 1.1 mol.) in pyridine (70 c. c.) were kept at 110° for ½ hr. p-Acetamidophenol (21 g.) was then added and the mixture boiled gently under reflux for 2 hours. The cooled solution was poured into a large volume of dilute HCl, from which the product was extracted with two portions of ethyl acetate. After being washed with very dilute caustic soda solution and then water the ethyl acetate was removed by distillation. The residual oil (20 g.; 90%) crystallised when seeded with some crystals of the diphenyl ether prepared in a preliminary experiment. However, recrystallisation was difficult and did not give a sharply melting product. The material was therefore redissolved in dry ethyl acetate and passed down a column of activated alumina. Recrystallisation of the most easily eluted fractions from alcohol gave 13 g. (58%) of the diphenyl ether melting at 173–175°. Repeated recrystallisation from alcohol or aqueous methanol yielded small, pale yellow needles, M. P. 178° (found C, 53.2; H, 4.8; $C_{21}H_{22}O_9N_4$ requires C, 53.15; H, 4.6%).

EXAMPLE 14

*3:5-dinitro-4-(4'-acetamidophenoxy)-N-acetyl-L-phenylalanine ethyl ester*

3:5-dinitro-N-acetyl-L-tyrosine ethyl ester (5 g.) and benzene-sulphonyl chloride (2.5 g.; 1.1 mol.) in pyridine (50 c. c.) were boiled for ½ hr. p-Acetamidophenol (7.5 g.) was then added and boiling continued for another hour. The product was extracted from dilute HCl with chloroform. The solid remaining after evaporation of the chloroform was dissolved in acetone and chromatographed on alumina to yield a pale yellow eluate, which was recrystallised from acetonitrile. A second crystallisation gave minute yellow needles (3.6 g.; 52%) beginning to soften at 110° but not completely melted till 160°. They were dried in vacuo at 60° before analysis (found: C, 52.6; H, 4.5; N, 12.0. $C_{21}H_{22}O_9N_4$ requires C, 53.2; H, 4.7; N, 11.8%).

EXAMPLE 15

*DL - 5 - (3'-5'-dinitro - 4'- p-acetamidophenoxybenzyl) -hydantoin*

DL-5-(3':5'-dinitro-4'-p-hydroxy-benzyl)-hydantoin (10 g.) and p-toluenesulphonyl chloride (6.5 g.; 1 mol.) in pyridine (40 c. c.) were heated at 100° for ¾ hr. After the addition of p-acetamidophenol (15 g.; 3 mol.) to the cooled solution the mixture was reheated for 2 hours, cooled and poured into diluted HCl. The solid was filtered off, washed, dissolved in the minimum amount of dilute caustic soda solution, filtered, and reprecipitated with dilute HCl. Recrystallisation from acetic acid using charcoal produced the pure ether as a yellow powder, melting with effervescence at 275°. A second crystallisation did not change the M. P. (8.6 g.; 60%) (found: C, 50.4; H, 3.6; N, 16.4. $C_{18}H_{15}O_8N_5$ requires C, 50.35; H, 3.5; N, 16.3%).

EXAMPLE 16

*Methyl - 3:5 - dinitro-4-(4'-benzamidophenoxy)-benzoate*

Methyl-3:5-dinitro-4-chlorobenzoate (5 g.) was dissolved in dry ethyl acetate (100 c. c.) and β-picoline (3.5 g.; 2 mols) was added. p-Benzamidophenol (8 g.; 2 mols) was added to the warm solution, which was then boiled gently for 5 hours. The solid remaining after removal of the solvent was washed with 2 N caustic soda, 2 N HCl and water, and recrystallised from acetic acid. The fine yellow needles (4.5 g.; 55%) then melted at 243–245°, raised to 245–247° by further recrystallisation. (Found C, 57.7; H, 3.6; N, 9.6 $C_{21}H_{15}O_8N_3$ requires C, 57.8; H, 3.4; N, 9.6%.)

I claim:

1. As new compounds, compounds of the general formula

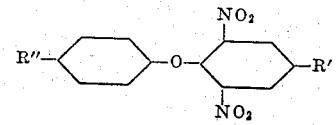

where R' is a grouping selected from the group consisting of groupings having the following formulae —COOZ, —CH₂CH₂COOZ,

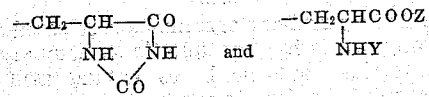

where Z is an alkyl group containing not more than four carbon atoms and Y is an acyl group, and R'' is a grouping selected from the group consisting of a hydroxy group, an alkoxy group, a hydrogen atom, an alkyl group, a nitro group, an acyloxy group, a carbalkoxy group and an acylamino group.

2. 3:5-dinitro-4-(4'-hydroxyphenoxy)benzylhydantoin.

3. 3:5-dinitro-4-(4'-methoxyphenoxy)benzylhydantoin.

4. L-3:5-dinitro - 4 - (4'- methoxyphenoxy) N-acetylphenylalanine ethyl ester.

5. L - 3:5 - dinitro - 4 -(4'-acetoxyphenoxy) N-acetylphenylalanine ethyl ester.

6. L-3:5-dinitro-4-(4'-acetamidophenoxy) N-acetylphenylalanine ethyl ester.

7. A process for the preparation of diphenylethers of the general formula

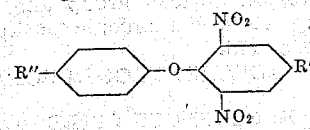

which comprises reacting a quaternary salt of the general formula

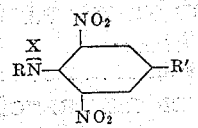

with a phenol of the general formula

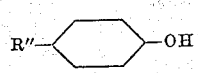

where RN is a tertiary organic base selected from the group consisting of aliphatic tertiary organic bases, tertiary organic bases having aryl and alkyl groups attached to the basic nitrogen atom and tertiary organic bases in which the tertiary nitrogen atom is part of a heterocyclic ring in which the other atoms in the ring are carbon atoms, R' is a grouping selected from the group consisting of groupings having the following formulae —COOZ, —CH₂CH₂COOZ,

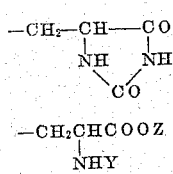

where Z is an alkyl group containing not more than four carbon atoms and Y is an acyl group, R'' is a grouping selected from the group consisting of a hydroxy group, an alkoxy group, a hydrogen atom, an alkyl group, a nitro group, an acyloxy group, a carbalkoxy group and an acylamino group and X is an anion selected from the group consisting of the anions of aryl sulphonic acids and the anions of hydrochloric acid, hydrobromic acid and hydriodic acid.

8. The process defined in claim 7 in which said reaction is carried out in a liquid medium having a dielectric constant not exceeding 25.

9. A process for the preparation of diphenylethers of the general formula

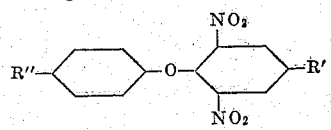

which comprises reacting together an ester of the general formula

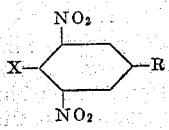

a phenol of the general formula

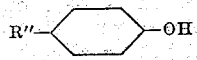

and a tertiary organic base selected from the group consisting of aliphatic tertiary organic bases, tertiary organic bases having alkyl and aryl groups attached to the basic nitrogen atom and tertiary organic bases in which the basic nitrogen atom is part of a heterocyclic ring in which the other atoms in the ring are carbon atoms, R' is a grouping selected from the group consisting of groupings having the following formulae —COOZ, —CH₂CH₂COOZ,

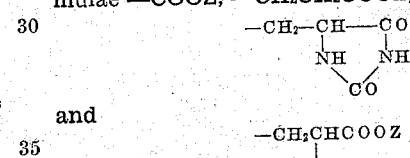

where Z is an alkyl group containing not more than four carbon atoms and Y is an acyl group, R'' is a grouping selected from the group consisting of a hydroxy group, an alkoxy group, a hydrogen atom, an alkyl group, a nitro group, an acyloxy group, a carbalkoxy group and an acylamino group and X is the anionic portion of an aryl sulphonic acid.

10. The process defined in claim 9 in which the reaction is carried out using in place of said ester compounds which when reacted together yield said ester.

11. The process defined in claim 9 in which the reaction is carried out in a liquid medium having a dielectric constant not exceeding 25.

12. A process for the preparation of 3:5-dinitro-4-(4'-methoxyphenoxy) N - acetyl phenylalanine ethyl ester which comprises reacting the p-toluenesulphonyl ester of N-acetyldinitro-tyrosine ethyl ester, said last mentioned ester having the formula

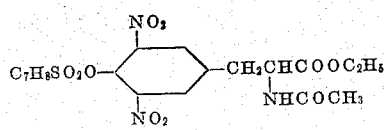

with pyridine and quinol monomethyl ether.

13. The process defined in claim 12 in which the L-isomer of said p-toluenesulphonyl ester is used.

14. A process for the preparation of 2:6-dinitrodiphenyl ethers of the general formula

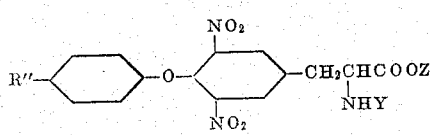

which comprises reacting a quaternary salt of the general formula

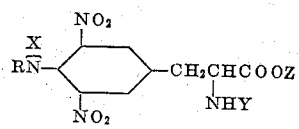

with a phenol of the general formula

where RN is a tertiary organic base selected from the group consisting of aliphatic tertiary organic bases, tertiary organic bases having alkyl and aryl groups attached to the basic nitrogen atom and tertiary organic bases in which the basic nitrogen atom is part of a heterocyclic ring in which the other atoms in the ring are carbon atoms, R'' is an alkoxy group, X is the anionic portion of an aryl sulphonic acid, Y is an acyl group and Z is an alkyl group containing not more than four carbon atoms.

15. The process defined in claim 14 in which the reaction is carried out in a liquid medium having a dielectric constant not exceeding 25.

16. The process defined in claim 14 in which the laevo isomer of said quaternary salt is used in the reaction.

17. A process for the preparation of diphenylethers of the general formula

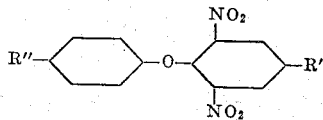

which comprises reacting a quaternary salt of the general formula

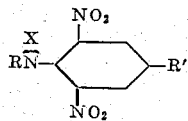

with a phenol of the general formula

where RN is a tertiary organic base selected from the group consisting of aliphatic tertiary organic bases, tertiary organic bases having aryl and alkyl groups attached to the basic nitrogen atom and tertiary organic bases in which the tertiary nitrogen atom is part of a heterocyclic ring in which the other atoms in the ring are carbon atoms, R' is a grouping selected from the group consisting of groupings having the following formulae —COOZ, —CH$_2$CH$_2$COOZ,

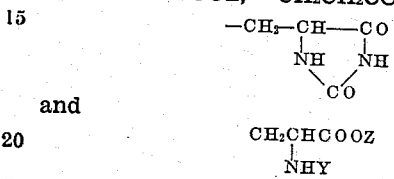

and $$\text{CH}_2\text{CHCOOZ}$$
$$|$$
$$\text{NHY}$$

where Z is an alkyl group containing not more than 4 carbon atoms and Y is an acyl group, R'' is a grouping selected from the group consisting of a hydroxy group, an alkoxy group, a hydrogen atom, an alkyl group, a nitro group, a carbalkoxy group, an acyloxy group and an acylamino group, X is the anionic portion of an aryl sulphonic acid.

EDWARD TEGGIN BORROWS.

REFERENCES CITED

The following references are of record in the file of this patent:

UNITED STATES PATENTS

| Number | Name | Date |
|---|---|---|
| 2,477,537 | Avakin | July 26, 1949 |

OTHER REFERENCES

Harington et al.: Biochem. Journal., vol. 21 (1929), pp. 169–183.